(12) United States Patent
Tian

(10) Patent No.: US 11,855,387 B2
(45) Date of Patent: Dec. 26, 2023

(54) PLUG-IN ASSEMBLY STRUCTURE AND AN UNMANNED AERIAL VEHICLE WITH COMPOSITE WING

(71) Applicant: Autoflight (Kunshan) Co., Ltd., Kunshan (CN)

(72) Inventor: Yu Tian, Hong Kong (CN)

(73) Assignee: AUTOFLIGHT (KUNSHAN) CO., LTD., Jiangsu Province (CN)

( * ) Notice: Subject to any disclaimer, the term of this patent is extended or adjusted under 35 U.S.C. 154(b) by 0 days.

(21) Appl. No.: 18/161,087

(22) Filed: Jan. 29, 2023

(65) Prior Publication Data
US 2023/0246383 A1 Aug. 3, 2023

(30) Foreign Application Priority Data
Jan. 29, 2022 (CN) .......................... 202220246181.6

(51) Int. Cl.
| | |
|---|---|
| *H01R 13/627* | (2006.01) |
| *B64U 30/10* | (2023.01) |
| *B64U 20/70* | (2023.01) |
| *B64U 50/30* | (2023.01) |
| *H01R 13/631* | (2006.01) |
| *B64C 1/26* | (2006.01) |
| *B64C 1/30* | (2006.01) |
| *H01R 4/50* | (2006.01) |
| *H01R 12/91* | (2011.01) |
| *H01R 13/62* | (2006.01) |

(52) U.S. Cl.
CPC ......... *H01R 13/6276* (2013.01); *B64U 20/70* (2023.01); *B64U 30/10* (2023.01); *B64U 50/30* (2023.01); *H01R 13/631* (2013.01); *B64C 1/26* (2013.01); *B64C 1/30* (2013.01); *H01R 4/5058* (2013.01); *H01R 12/91* (2013.01); *H01R 13/62* (2013.01)

(58) Field of Classification Search
CPC .................................................. H01R 13/6276
See application file for complete search history.

(56) References Cited

U.S. PATENT DOCUMENTS

| | | | | |
|---|---|---|---|---|
| 4,179,175 A | * | 12/1979 | Farnworth | ......... H01R 13/7036 439/348 |
| 4,610,496 A | * | 9/1986 | Schwartz | ........... H01R 13/6276 439/348 |
| 2017/0348832 A1 | * | 12/2017 | Yang | .................... B23B 31/1071 |
| 2018/0257778 A1 | * | 9/2018 | Tian | .......................... B64C 1/26 |

* cited by examiner

*Primary Examiner* — James Harvey
(74) *Attorney, Agent, or Firm* — WPAT LAW, P.C.; Anthony King

(57) ABSTRACT

A plug-in assembly structure for a UAV includes a first component (1), a second component (2) and a limit assembly (3). The first component (1) includes a first plug (11) and a positioning sleeve (12), and the positioning sleeve (12) is provided with a first through hole (121). The second component (2) includes a second plug (21), the radial direction of the second plug (21) is provided with a limit hole (2111), the second plug (21) can be electrically connected to the first plug (11), and the limit hole (2111) is facing the first through hole (121). The limit assembly (3) is installed in the limit hole (2111). The limit assembly (3) includes a first elastic element (31) and a limit element (32).

20 Claims, 4 Drawing Sheets

PLUG-IN ASSEMBLY STRUCTURE AND AN UNMANNED AERIAL VEHICLE WITH COMPOSITE WING

FIELD OF THE DISCLOSURE

The invention relates to the technical field of unmanned aerial vehicles, in particular to a plug-in assembly structure and an unmanned aerial vehicle with composite wing.

BACKGROUND OF THE INVENTION

Unmanned Aerial Vehicle is an unmanned aircraft controlled by radio remote control equipment and its own program control device. The UAVs in the prior art are mainly comprising fixed wing UAVs, multi rotor UAVs and composite wing UAVs. In practical use, fixed wing UAVs and multi rotor UAVs have their own advantages. The fixed wing UAVs have the characteristics of long endurance and high altitude flight, and are widely used in surveying and mapping, geology, petroleum, agriculture and forestry industries. The multi rotor UAVs can take off and land vertically and hover in fixed space, which are mainly applicable to low altitude, low speed, vertical takeoff and landing, and hover operations.

With the rapid development of UAV technology, the function of UAV has improved a lot, which has been deeply integrated into the operation of various industries. However, the complexity of UAV's application also poses a higher challenge to the structure and performance of UAV. At present, the UAV with composite wing has the advantages of both vertical takeoff and landing capability and long endurance flight, so the UAV with composite wing has gradually become the focus of the UAV field.

Although the UAV with composite wing has the advantages of fixed wing UAV and multi rotor UAV, it also has structural redundancy, thus resulting in many problems. The UAV with composite wing is usually large in size, and the existing technology adopts the design of multi segment structure, that is, the UAV with composite wing is designed into a multi segment structure including wings, fuselage and tail. Multi segment structures need to be assembled before in use, especially the assembly of the electrical system. The assembly process is complex, and the cables of the electrical system are severely damaged by body vibration, which is not convenient for the repeated disassembly and use of the UAV with composite wing.

SUMMARY OF THE INVENTION

Based on the above mention, the invention aims to provide a plug-in assembly structure and a UAV with composite wing. The plug-in assembly structure can be quickly assembled and disassembled with the fuselage to improve the assembly efficiency. The UAV with composite wing can be quickly assembled and put into use.

To solve the above technical problem, the present invention provides a plug-in assembly structure, comprising:
  a first component, which comprises a first plug and a positioning sleeve; the positioning sleeve is sleeved on the periphery of the first plug, and the positioning sleeve is provided with a first through hole;
  a second component, which comprises a second plug, the radial direction of the second plug is provided with a limit hole, the second plug is configured to be electrically connected with the first plug, and the limit hole is opposite to the first through hole; and
  a limit assembly, which is installed in the limit hole; the limit assembly comprises a first elastic element and a limit element; one end of the first elastic element is abutted against the bottom of the limit hole, and the other end of the first elastic element is connected to the limit element; the limit element is at least partially located in the limit hole, and the first elastic element is used to push the limit element toward the outside of the limit hole.

As a preferred solution to the plug-in assembly structure, the plug-in assembly structure may further comprise a limit releasing mechanism, the limit releasing mechanism can comprise a sleeve, a firing pin and a second elastic element; both of the axial ends of the sleeve can have open ends, and the firing pin can be coaxial with the sleeve; one end of the second elastic element can be butted with the sleeve, and the other end of the second elastic element can be butted with the firing pin, so that the firing pin can move back and forth along the axis direction of the sleeve; the sleeve can be connected to the positioning sleeve, and the firing pin can be facing the first through hole.

As a further preferred solution to the plug-in assembly structure, the first plug can comprise a first plug housing and a first end cover, the circumferential outer side of the first plug housing can be connected to the positioning sleeve, the first plug housing can comprise a first plug housing side, the first end cover can be connected to the first plug housing side in a sliding mode, the first end cover can be provided with an electrical connection socket, which can be suitable to be electrically connected with a cable.

As a further preferred solution to the plug-in assembly structure, the first end cover can be provided with at least two electrical connection sockets.

As a further preferred solution to the plug-in assembly structure, the types of multiple electrical connection sockets can be different.

As a further preferred solution to the plug-in assembly structure, the first plug can further comprise a third elastic element, one end of the third elastic element can be abutted with the first end cover, and the other end of the third elastic element can be abutted with the first plug housing, so that the first end cover can repeatedly move relative to the first plug housing.

As a further preferred solution to the plug-in assembly structure, the first plug housing side can be slidingly connected to the circumferential outer wall of the first end cover.

As a further preferred solution to the plug-in assembly structure, the second plug can comprise a second plug housing, a second end cover and a fourth elastic element; the radial direction of the second plug housing can be provided with the limit hole, the second plug housing can comprise a second open end, the second end cover can be connected to the second open end in a sliding way, and the second end cover can be provided with an electrical connection plug, which can be suitable to be electrically connected to a cable; one end of the fourth elastic element can be abutted with the second end cover, and the other end of the fourth elastic element can be abutted with the second plug housing, so that the second end cover can repeatedly move relative to the second plug housing.

As a further preferred solution to the plug-in assembly structure, a positioning slot can be arranged between the first plug and the positioning sleeve; the second component can further comprise a limit plug plate, the limit plug plate can extend outwardly from one end of the second plug along the axial direction of the second plug, and the limit plug plate can be configured to be inserted with the positioning slot.

An unmanned aerial vehicle with composite wing, comprises a body, a tail and a plug-in assembly structure according to any one of the preceding solutions; the first component is electrically connected to the tail, and the second component is electrically connected to the fuselage.

The invention has the beneficial effects that:

The invention provides a plug-in assembly structure, comprising a first component, which comprises a first plug and a positioning sleeve. The positioning sleeve is sleeved on the periphery of the first plug, and the positioning sleeve is provided with a first through hole; a second component, which comprises a second plug, the radial direction of the second plug is provided with a limit hole, the second plug is configured to be electrically connected with the first plug, and the limit hole is opposite to the first through hole; and a limit assembly, which is installed in the limit hole; the limit assembly comprises a first elastic element and a limit element; one end of the first elastic element is abutted against the bottom of the limit hole, and the other end of the first elastic element is connected to the limit element; the limit element is at least partially located in the limit hole, and the first elastic element is used to push the limit element toward the outside of the limit hole. The separation of the first component and the second component is achieved by the limit assembly. When the axial direction of the limit element is subjected to an external force, the first elastic element is compressed to realize the separation of the first component and the second component.

The invention also provides a UAV with composite wing, the above mentioned plug-in assembly structure is applied to enable the structure and electrical system of the fuselage and tail to be quickly assembled and disassembled at the same time, thus improving the assembly efficiency.

BRIEF DESCRIPTION OF DRAWINGS

In order to more clearly explain the technical solution in the embodiments of the invention, the following will briefly introduce the drawings addressed in the description of the embodiments of the invention. Obviously, the drawings in the following description are only some embodiments of the invention. For ordinary technicians in the field, other drawings can also be obtained according to the contents of the embodiments of the invention and these drawings.

Figure 1:
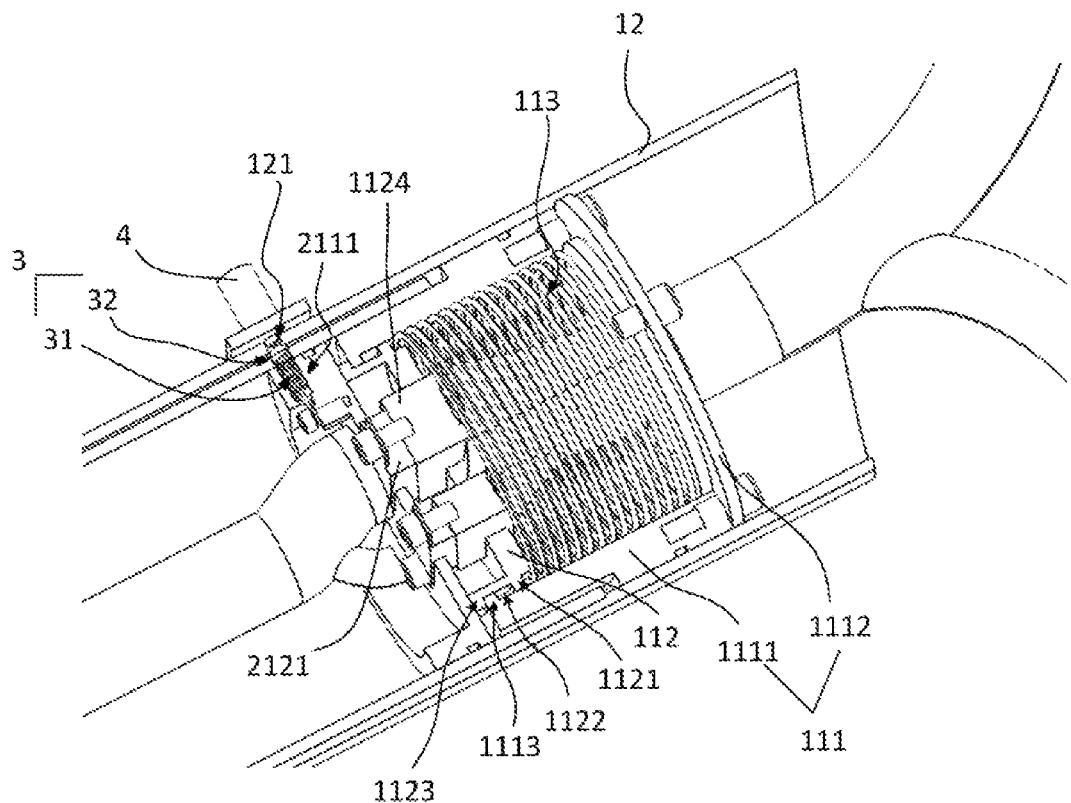
FIG. 1 is a schematic diagram of the plug-in assembly structure provided by the specific embodiment of the invention.

The following call-out list of elements in the drawing can be a useful guide when referencing the elements of the drawing figures:

1 first component; 11 first plug; 111 first plug housing; 1111 first plug housing side; 1112 bottom of the first plug housing; 1113 housing limit bulge; 112 first end cover; 1121 first end cover convex; 1122 chute; 1123 second end cover convex; 1124 electrical connection socket; 113 third elastic element; 12 positioning sleeve; 121 first through hole; 13 positioning slot;

2 second component; 21 second plug; 211 second plug housing; 2111 limit hole; 212 second end cover; 2121 electrical connection plug; 22 limit plug plate;

3 limit assembly; 31 first elastic element; 32 limit element;

4 limit releasing mechanism; 41 sleeve; 42 firing pin; 43 second elastic element;

100 fuselage; 200 tail.

DETAILED DESCRIPTION

In order to make the technical problems solved, the technical solutions adopted and the technical effects achieved by the invention clearer, the technical solutions of the embodiments of the invention will be further described in detail with the attached drawings. Obviously, the described embodiments are only part of the embodiments of the invention, not all of the embodiments. Based on the embodiments in the invention, all other embodiments obtained by those skilled in the art without creative work fall within the scope of protection of the invention.

Figure 2:
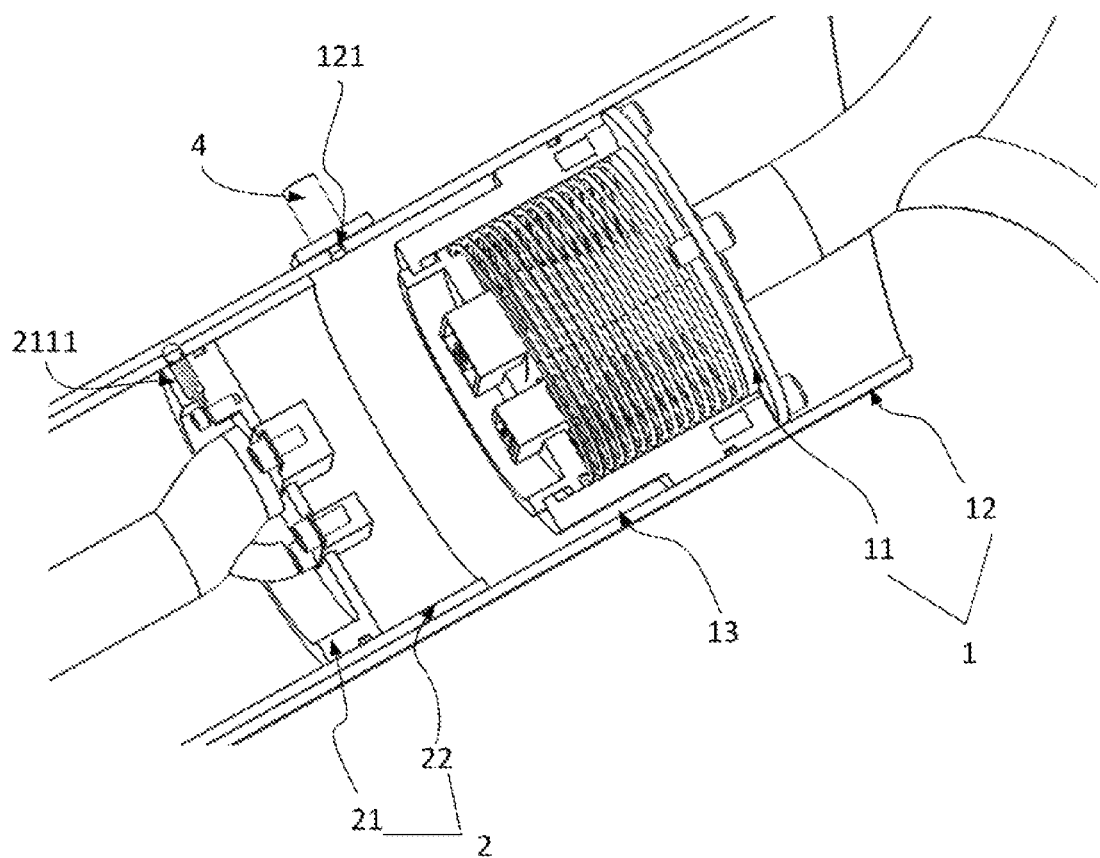
FIG. 2 is a sectional view of the plug-in assembly structure provided by the specific embodiment of the invention.
Figure 3:
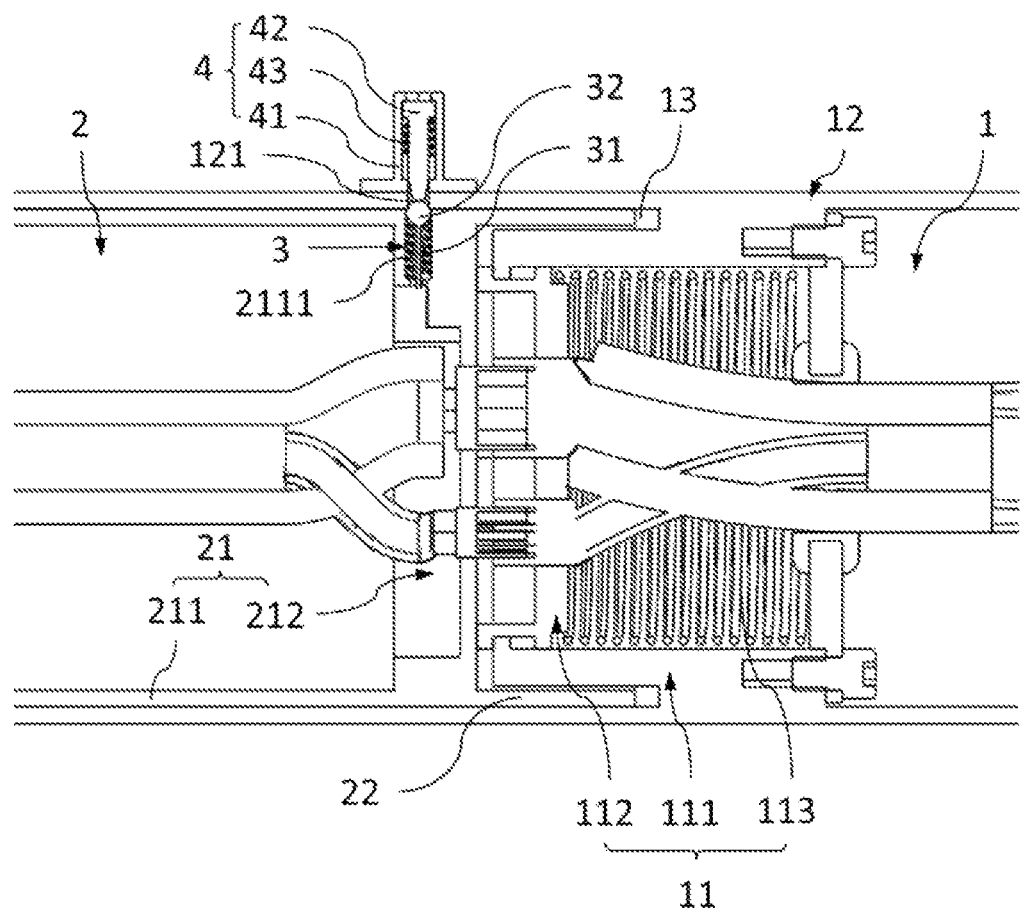
FIG. 3 is a partial structural diagram of the first plug and the second plug provided by the invention.

As shown in FIGS. 1 and 2, this embodiment provides a plug-in assembly structure, including: a first component 1, a second component 2 and a limit assembly 3. The first component 1 includes the first plug 11 and the positioning sleeve 12. The positioning sleeve 12 is sleeved on the periphery of the first plug 11, and the positioning sleeve 12 is provided with a first through hole 121. Specifically, as shown in FIG. 3, in this embodiment, the first plug 11 and the positioning sleeve 12 are cylindrical, which can also be in other shapes. The first plug 11 includes the first plug housing 111 and the first end cover 112, the circumferential outer side of the first plug housing 111 is connected to the positioning sleeve 12, the first plug housing 111 includes the first plug housing side 1111 and the bottom of the first plug housing 1112, and the first end cover 112 is slidably connected to the first plug housing side 1111. Specifically, the circumferential outer wall of the end cover 112 is slidably connected to the first plug housing side 1111. Specifically, the circumferential direction of the first end cover 112 forms the chute 1122, and the first end cover 112 is provided with the first end cover convex 1121 in the radial direction, the first plug housing side 1111 is provided with the housing limit bulge 1113 in the radial direction which is slidably connected with the chute 1122. The housing limit bulge 1113 and the first end cover convex 1121 ensure that the first end cover 112 is at least partially connected with the first plug housing side 1111 to prevent it from sliding out of the first plug housing side 1111. The first plug 11 further includes a third elastic element 113, one end of the third elastic element 113 is abutted with the first end cover 112, and the other end of the third elastic element 113 is abutted with the bottom of the first plug housing 1112, so that the first end cover 112 can move repeatedly relative to the bottom of the first plug housing 1112. Preferably, the first end cover 112 can further be provided with the second end cover convex 1123, which can prevent the first end cover 112 from being pressed too deeply in axial direction. After the first plug 11 and the second plug 21 are connected, the third elastic element 113 optimizes the existing rigid connection and realizes the flexible connection. When the vibration is large, the connection of the electrical system usually fails or can be damaged. The third elastic element 113 can absorb the energy of the vibration and ensure the reliable connection of the electrical system.

In addition, the first end cover 112 is provided with an electrical connection socket 1124, which is electrically connected with the cable. Preferably, the first end cover 112 is provided with at least two electrical connection sockets 1124. The types of multiple electrical connection sockets 1124 can be different, including but not limited to control input sockets and power input sockets.

Continue to refer to FIG. 2, the second component 2 includes the second plug 21, the second plug 21 is radially provided with a limit hole 2111, the second plug 21 is configured to be electrically connected with the first plug 11, and the limit hole 2111 is facing the first through hole 121. The second plug 21 is provided with an electrical connection plug 2121 matched with the first plug 11 to realize the electrical connection.

As a preferred solution, the second plug 21 can also be internally equipped with an elastic element and a limit element like the first plug 11 to enable the elastic element to absorb the energy of vibration and ensure the reliable connection of the electrical system. Specifically, the second plug 21 includes the second plug housing 211, the second end cover 212 and the fourth elastic element. The second plug housing 211 is radially provided with the limit hole 2111, the second plug housing 211 includes the second open end, the second end cover 212 is connected to the second open end in sliding manner, the second end cover 212 is equipped with the electrical connection plug 2121, and the electrical connection plug 2121 is connected with the cable. One end of the fourth elastic element is abutted against the second end cover 212, and the other end of the fourth elastic element is abutted against the second plug housing 211, so that the second end cover 212 can move repeatedly relative to the second plug housing 211.

The limit assembly 3 is installed in the limit hole 2111. The limit assembly 3 includes the first elastic element 31 and the limit element 32. One end of the first elastic element 31 is connected to the bottom of the limit hole 2111. The other end of the first elastic element 31 is connected to the limit element 32. The limit element 32 is at least partially located in the limit hole 2111 and the first elastic element 31 is used to push the limit element 32 towards the outside of the limit hole 2111. Specifically, in this embodiment, the first elastic element 31 is a spring, and the limit element 32 is a metal column or metal ball. Under the relaxation state of the first elastic element 31, the limit element 32 is convex on the peripheral surface of the second plug 21.

When the first component 1 and the second component 2 are connected, the limit element 32 is abutted with the positioning sleeve 12, and the positioning sleeve 12 presses the limit element 32 into the limit hole 2111 until the limit element 32 facing the first through hole 121, and the limit element 32 enters the first through hole 121 under the elastic force of the first elastic element 31 to complete the insertion of the first component 1 and the second component 2. The circumferential direction of the limit element 32 is abutted with the positioning sleeve 12 and/or the limit hole 2111, thus limiting the separation of the first component 1 and the second component 2. When the end of the limit element 32 that is far away from the first elastic element 31 is subjected to an axial external force, the first elastic element 31 is compressed, and the limit element 32 is driven to enter the limit hole 2111. At this time, the first component 1 and the second component 2 can be separated.

As a preferred solution, as shown in FIG. 3, the plug-in assembly structure further includes a limit releasing mechanism 4, which includes a sleeve 41, a firing pin 42 and a second elastic element 43. The axial ends of the sleeve 41 comprises both open ends. The firing pin 42 is coaxial with the sleeve 41. The firing pin 42 can extend from one of the open ends of the sleeve 41. The operator can apply external force to the firing pin 42 through the other open end of the sleeve 41. The inner side of the sleeve 41 is provided with a convex plate, one end of the firing pin 42 is provided with a contact cap, one end of the second elastic element 43 is abutted with the convex plate in the sleeve 41, and the other end of the second elastic element 43 is abutted with the contact cap of the firing pin 42, so that the firing pin 42 can move back and forth along the axis direction of the sleeve 41. The sleeve 41 is connected to the outer surface of the positioning sleeve 12, and the firing pin 42 is facing the first through hole 121.

As a preferred solution, as shown in FIG. 2, there is a positioning slot 13 between the first plug 11 and the positioning sleeve 12, and the second component 2 further includes a limit plug plate 22, which extends outward along the axial direction of the second plug 21 from one end of the second plug 21, and the limit plug plate 22 is configured to plug with the positioning slot 13. It is pointed out that the positioning slot 13 is an arc slot, and the limit plug 22 is a plug plate corresponding to the shape of the positioning slot 13. When the limit plug 22 is aligned with the positioning slot 13, the quick positioning of the first plug 11 and the second plug 21 can be achieved.

Figure 4:
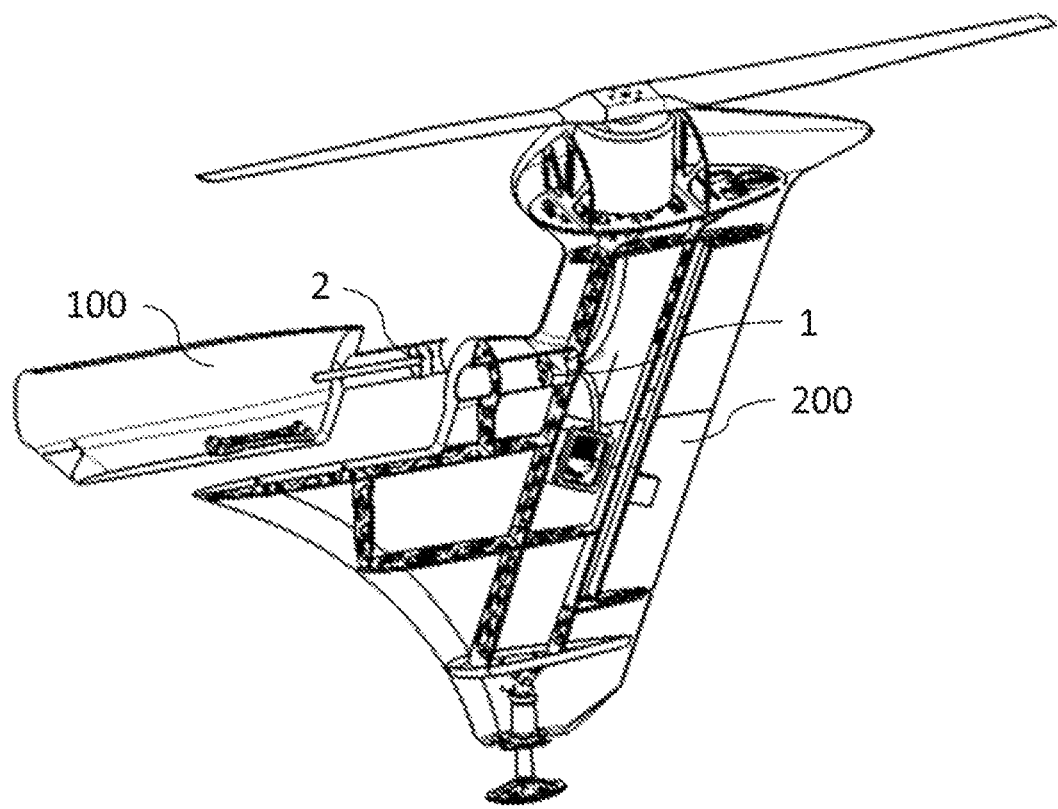
FIG. 4 is a partial structural diagram of the UAV with composite wing provided by the specific embodiment of the invention.

As shown in FIG. 4, a UAV with composite wing includes the fuselage 100, the tail 200 and the plug-in assembly structure described in any of the above schemes. The electrical connection socket 1124 in the first component 1 is electrically connected to the tail cable, the other end of the tail cable is electrically connected to the steering engine and/or rotor motor in the UAV tail 200, and the electrical connection plug 2121 in the second component 2 is electrically connected to the fuselage cable, the other end of the fuselage cable is electrically connected to one and/or more electrical equipment in the fuselage 100. This arrangement enables the structure and electrical system of the fuselage 100 and the tail 200 to be quickly assembled and disassembled at the same time, improving the assembly efficiency.

Note that the above is only an exemplary embodiment of the invention and the applied technical principles. Those skilled in the art will understand that the invention is not limited to the specific embodiments described here. For those skilled in the art, various obvious changes, readjustments and replacements can be made without departing from the protection scope of the invention. Therefore, although the invention is described in more detail through the above embodiments, the invention is not limited to the above embodiments, but can also include more equivalent embodiments without departing from the concept of the invention, and the scope of the invention is determined by the scope of the appended claims.

In the description of the invention, it should be noted that the orientation or position relationship indicated by the terms "center", "up", "down", "left", "right", "vertical", "horizontal", "inside", "outside", etc. is based on the orientation or position relationship shown in the attached drawings, which is only for the convenience of describing the invention and simplifying the description, rather than indicating or implying that the device or element referred to must have a specific orientation, or is constructed and operated in a specific orientation, so it cannot be understood as a restriction on the invention. In addition, the terms "first" and "second" are only used for descriptive purposes and cannot be understood as indicating or implying relative importance. The terms "first position" and "second position" are two different positions.

In the description of the invention, it should be noted that unless otherwise specified and limited, the terms "installation", "connection" and "connection" should be understood in a broad sense, for example, they can be fixed connection, removable connection, or integrated connection. It can be mechanical connection or electrical connection. It can be directly connected, or indirectly connected through intermediate media, or it can be the internal connection of two components. For those skilled in the art, the specific meaning of the above terms in the invention can be understood in a specific case.

What is claimed is:

1. A plug-in assembly structure comprises:
    a first component (1), which comprises a first plug (11) and a positioning sleeve (12); the positioning sleeve (12) is sleeved on a periphery of the first plug (11), and the positioning sleeve (12) is provided with a first through hole (121);
    a second component (2), which comprises a second plug (21), a radial direction of the second plug (21) is provided with a limit hole (2111), the second plug (21) is configured to be electrically connected with the first plug (11), and the limit hole (2111) is opposite to the first through hole (121); and
    a limit assembly (3), which is installed in the limit hole (2111); the limit assembly (3) comprises a first elastic element (31) and a limit element (32); a first end of the first elastic element (31) is abutted against the bottom of the limit hole (2111), and a second end of the first elastic element (31) is connected to the limit element (32);
    wherein the limit element (32) is at least partially located in the limit hole (2111), and the first elastic element (31) is used to push the limit element (32) toward an outside of the limit hole (2111).

2. The plug-in assembly structure of claim 1 further comprising a limit releasing mechanism (4) having a sleeve (41), a firing pin (42) and a second elastic element (43); wherein a first end and a second end of the axial ends of the sleeve (41) each has an open end, and the firing pin (42) is coaxial with the sleeve (41); wherein a first end of the second elastic element (43) is butted with the sleeve (41), and a second end of the second elastic element (43) is butted with the firing pin (42), so that the firing pin (42) can move back and forth along an axis direction of the sleeve (41); wherein the sleeve (41) is connected to the positioning sleeve (12), and the firing pin (42) is facing the first through hole (121).

3. The plug-in assembly structure of claim 1, characterized in that the first plug (11) comprises a first plug housing (111) and a first end cover (112), a circumferential outer side of the first plug housing (111) is connected to the positioning sleeve (12), the first plug housing (111) comprises a first plug housing side (1111), the first end cover (112) is connected to the first plug housing side (1111) in a sliding mode, the first end cover (112) is provided with an electrical connection socket (1124), which is suitable to be electrically connected with a cable.

4. The plug-in assembly structure of claim 3, characterized in that the first end cover (112) is provided with at least two electrical connection sockets (1124).

5. The plug-in assembly structure of claim 4, characterized in that said at least two electrical connection sockets (1124) contain at least two different types of sockets.

6. The plug-in assembly structure according to claim 3, characterized in that the first plug (11) further comprises a third elastic element (113), a first end of the third elastic element (113) is abutted with the first end cover (112), and a second end of the third elastic element (113) is abutted with the first plug housing (111), so that the first end cover (112) can repeatedly move relative to the first plug housing (111).

7. The plug-in assembly structure according to claim 3, characterized in that the first plug housing side (1111) is slidingly connected to the circumferential outer wall of the first end cover (112).

8. The plug-in assembly structure of claim 1, characterized in that the second plug (21) comprises a second plug housing (211), a second end cover (212) and a fourth elastic element; a radial direction of the second plug housing (211) is provided with said limit hole (2111), the second plug housing (211) comprises a second open end, the second end cover (212) is connected to the second open end in a sliding way, and the second end cover (212) is provided with an electrical connection plug (2121), which is suitable to be electrically connected to a cable; a first end of the fourth elastic element is abutted with the second end cover (212), and a second end of the fourth elastic element is abutted with the second plug housing (211), so that the second end cover (212) can repeatedly move relative to the second plug housing (211).

9. The plug-in assembly structure of claim 1, characterized in that a positioning slot (13) is arranged between the first plug (11) and the positioning sleeve (12); the second component (2) further comprises a limit plug plate (22), the limit plug plate (22) extends outwardly from one end of the second plug (21) along the axial direction of the second plug (21), and the limit plug plate (22) is configured to be inserted with the positioning slot (13).

10. An unmanned aerial vehicle (UAV) with composite wing, characterized in that it comprises a fuselage (100), a tail (200) and a plug-in assembly structure according to claim 1; the first component (1) is electrically connected to the tail (200), and the second component (2) is electrically connected to the fuselage (100).

11. The plug-in assembly structure according to claim 4, characterized in that the first plug (11) further comprises a third elastic element (113), a first end of the third elastic element (113) is abutted with the first end cover (112), and a second end of the third elastic element (113) is abutted with the first plug housing (111), so that the first end cover (112) can repeatedly move relative to the first plug housing (111).

12. The plug-in assembly structure according to claim 5, characterized in that the first plug (11) further comprises a third elastic element (113), a first end of the third elastic element (113) is abutted with the first end cover (112), and a second end of the third elastic element (113) is abutted with the first plug housing (111), so that the first end cover (112) can repeatedly move relative to the first plug housing (111).

13. The plug-in assembly structure according to claim 4, characterized in that the first plug housing side (1111) is slidingly connected to the circumferential outer wall of the first end cover (112).

14. The plug-in assembly structure according to claim 5, characterized in that the first plug housing side (1111) is slidingly connected to the circumferential outer wall of the first end cover (112).

15. The plug-in assembly structure according to claim 6, characterized in that the first plug housing side (1111) is slidingly connected to the circumferential outer wall of the first end cover (112).

16. An unmanned aerial vehicle (UAV) with composite wing, characterized in that it comprises a fuselage (100), a tail (200) and a plug-in assembly structure according to claim 3; the first component (1) is electrically connected to the tail (200), and the second component (2) is electrically connected to the fuselage (100).

17. An unmanned aerial vehicle (UAV) with composite wing, characterized in that it comprises a fuselage (100), a tail (200) and a plug-in assembly structure according to claim 5; the first component (1) is electrically connected to the tail (200), and the second component (2) is electrically connected to the fuselage (100).

18. An unmanned aerial vehicle (UAV) with composite wing, characterized in that it comprises a fuselage (100), a tail (200) and a plug-in assembly structure according to claim 7; the first component (1) is electrically connected to the tail (200), and the second component (2) is electrically connected to the fuselage (100).

19. An unmanned aerial vehicle (UAV) with composite wing, characterized in that it comprises a fuselage (100), a tail (200) and a plug-in assembly structure according to claim 8; the first component (1) is electrically connected to the tail (200), and the second component (2) is electrically connected to the fuselage (100).

20. An unmanned aerial vehicle (UAV) with composite wing, characterized in that it comprises a fuselage (100), a tail (200) and a plug-in assembly structure according to claim 9; the first component (1) is electrically connected to the tail (200), and the second component (2) is electrically connected to the fuselage (100).

\* \* \* \* \*